United States Patent
Ross et al.

(10) Patent No.: US 12,366,790 B1
(45) Date of Patent: Jul. 22, 2025

(54) DEPLOYABLE MULTIPLE LIGHTING SYSTEM FOR RESIDENTIAL AND COMMERCIAL INTERIOR PHOTOGRAPHY AND METHOD THEREOF

(71) Applicants: Matthew Ross, Saginaw, TX (US); Jennie Edgerton, Saginaw, TX (US)

(72) Inventors: Matthew Ross, Saginaw, TX (US); Jennie Edgerton, Saginaw, TX (US)

( * ) Notice: Subject to any disclaimer, the term of this patent is extended or adjusted under 35 U.S.C. 154(b) by 0 days.

(21) Appl. No.: 17/493,189

(22) Filed: Oct. 4, 2021

(51) Int. Cl.
G03B 15/05 (2021.01)
G03B 17/56 (2021.01)
H04N 23/56 (2023.01)
H04N 23/66 (2023.01)
H04N 23/74 (2023.01)
H05B 47/19 (2020.01)

(52) U.S. Cl.
CPC ............ *G03B 15/05* (2013.01); *H04N 23/56* (2023.01); *H04N 23/66* (2023.01); *H04N 23/74* (2023.01); *H05B 47/19* (2020.01); *G03B 17/561* (2013.01); *G03B 2215/056* (2013.01)

(58) Field of Classification Search
CPC .............. G03B 15/05; G03B 17/561; G03B 2215/056; H04N 23/56; H04N 23/66; H04N 23/74; H05B 47/19
See application file for complete search history.

(56) References Cited

U.S. PATENT DOCUMENTS

| 10,044,941 B2 * | 8/2018 | Falk ................. H04N 23/74 |
| 2015/0195637 A1 * | 7/2015 | Pawlan ............. F16M 11/28 |
| | | 248/161 |

OTHER PUBLICATIONS

Photography Lighting Buying Guide (Year: 2009).*

* cited by examiner

*Primary Examiner* — Sinh Tran
*Assistant Examiner* — Angel L Garces-Rivera
(74) *Attorney, Agent, or Firm* — Richard Eldredge; Leavitt Eldredge Law Firm

(57) ABSTRACT

A deployable multiple lighting system for residential and commercial interior photography and method thereof are disclosed. System and method include the use of multiple-off camera, synced, battery operated flashes mounted to adjustable height light stands to photograph a residential or building interior, thereby creating a desirable look providing consistent, natural-looking diffused lighting within the space and between various areas and rooms where measurements of light (e.g., Kelvin and Lux) change dramatically.

1 Claim, 9 Drawing Sheets

DEPLOYABLE MULTIPLE LIGHTING SYSTEM FOR RESIDENTIAL AND COMMERCIAL INTERIOR PHOTOGRAPHY AND METHOD THEREOF

BACKGROUND

1. Field of the Invention

The present invention relates generally to lighting systems for photography, and more specifically to a lighting system that utilizes multiple, synced, low powered flashes to photograph residential and commercial building interiors.

2. Description of Related Art

Lighting systems for photography are well known in the art and are effective means to provide light to aid in the creation of photographs. A photograph's image quality is the perceived brightness, uniformity and range of light, contrast, resolution, and color accuracy. The complex mix of technology, both the hardware and software, in concert with the photographic narrative choices, dramatically impact the perceived quality of the resultant image. In addition, photography method, narrative, technology, techniques, and equipment impact the on-site capture time post-production processing time. Common techniques and equipment include single frame ambient lighting, single frame camera mounted strobe lighting, multiple ambient frames, multiple frames single strobe lighting, and multiple frames hybrid of strobe and ambient lighting.

Single Frame Ambient Technique

Single frame ambient technique utilizes ambient lighting to capture the exterior of residential and commercial buildings, as they deliver accurate color and fine detail. The results are easily processed in post-production and reflect the skill of the photographer and photographic choices. This approach, however, is difficult to control on location and in post-production processing when capturing images for the interior of residential and commercial buildings. For the interior, ambient light is the mixture of natural sunlight and artificial light from overhead fixtures and lamps. The intensity (Lux) and color (Kelvin) varies dramatically between ambient light sources, thereby impacting the captured interior images. Because the final processed image reflects quality, intensity, temperature of the light, skill of the photographer, and the photographer's photographic choices, post-production processing of captured images to correct the accuracy of color can be tedious and time consuming.

Single Frame Camera Mounted Strobe Technique

Single frame, camera mounted strobe lighting offers more control of light. This approach allows photographers to control light to: (1) cast "wrong" shadows that would not naturally occur in the room; (2) create a "flashy" look where areas near the camera are overly illuminated and the light fades the on objects further away from the camera; (3) create a pool of light surrounding the area closest to the camera mounted strobe; and (4) create a glare (secularity) on reflective surfaces such as cabinetry and windows. This approach allows colors to be more accurate when close consideration is paid to the camera placement, composition, and the photographic narrative choices made by the photographer. However, the approach requires considerable management of the strobe light source and its operating power source.

Multiple Ambient Frames Technique

Multiple ambient frames at different exposures are commonly referred to as a High Dynamic Range image (HDRi). These types of images rely on specialized software, computer resources, and a digital enhancement process to create a merged image through alignment of multiple captured images. Imperfect image alignment from camera movement creates soft, out of focus image with odd shadows and ghosts. The resultant merged image is significantly processed and reflect camera's hardware settings and software to achieve the digitally merged image results. In low light and low contrast spaces this method of digitally merging images rarely delivers what is considered a quality result. Moreover, the results of this technique are often exaggerated color casts and window blooms which ultimately reflects upon the photographer's skills.

Multiple Frames Single Strobe Technique

This technique illuminates a space with an off-camera strobe positioned in a different location within the space for each frame captured, then layered and blended into the resultant composited image. This technique allows images to be well illuminated, finely detailed, and accurately depict color. One disadvantage, however, is that the strobe is hand-held, and it relies heavily on the photographer's experience and ability to visualize the final blended imaged. For example, this technique requires the photographer or assistant managing the strobe and external battery pack to move to several positions within a composition of a desired image, thereby increasing camera movement. A photographer simply changing their stance between shots can move a camera that is firmly mounted on a tripod.

Another disadvantage of this technique is that special care must be taken to capture as many frames as necessary correctly illuminating every area of the space to achieve the desired perceived image quality. Post-production processing time is considerable and requires experience and advanced skill to achieve the desired results. While processing techniques vary, a blended image requires at least three frames, and frequently, more frames achieve the desired results to correct lux, kelvin, wrong shadows, pools of irregular light, color casts, and glare.

Multiple Frame Hybrid of Strobe and Ambient Lighting

Multiple frames hybrid of strobe and ambient lighting is popular for creating residential or building interior images for residential and commercial applications. The technique illuminates a space with a single strobe positioned in a different location in the space for each frame to eliminate light pooling and wrong shadows. The technique also adds ambient layers captured at different exposures to create an image more reflective of the natural occurring light in the space. These images are manually blended and merged into a single blended image. The disadvantage of this technique, however, is that post-production processing is time consuming. While processing techniques vary, every blended image requires at least three frames, and often require more to achieve the desired results.

Hence, what is needed is a system and method to consistently deliver images that are uniformly illuminated; display a wide range of light and contrast; and accurately depict the colors and shadows naturally occurring in the space. In addition, image quality needs to be improved, while reducing the on-site capture and post-production processing time and resource requirements. The system must be entirely mobile, easily deployable, and when in use quickly configurable and adjustable by a single photographer.

SUMMARY OF THE INVENTION

The present invention provides a deployable multiple lighting system that requires one photographer to deliver, deploy, configure, adjust, or otherwise operate. The system utilizes multiple off-camera synced, light weight, internal battery-operated flashes (also known as speed lights) mounted on tall telescoping, weighted and adjustable light stands (also known as footed monopods) to photograph a building's interior. The system significantly reduces location capture and processing times.

The present invention provides a method for capturing single frame photographs of a building's interior.

The present invention also provides a method for capturing two frame composite photographs of a building's interior.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
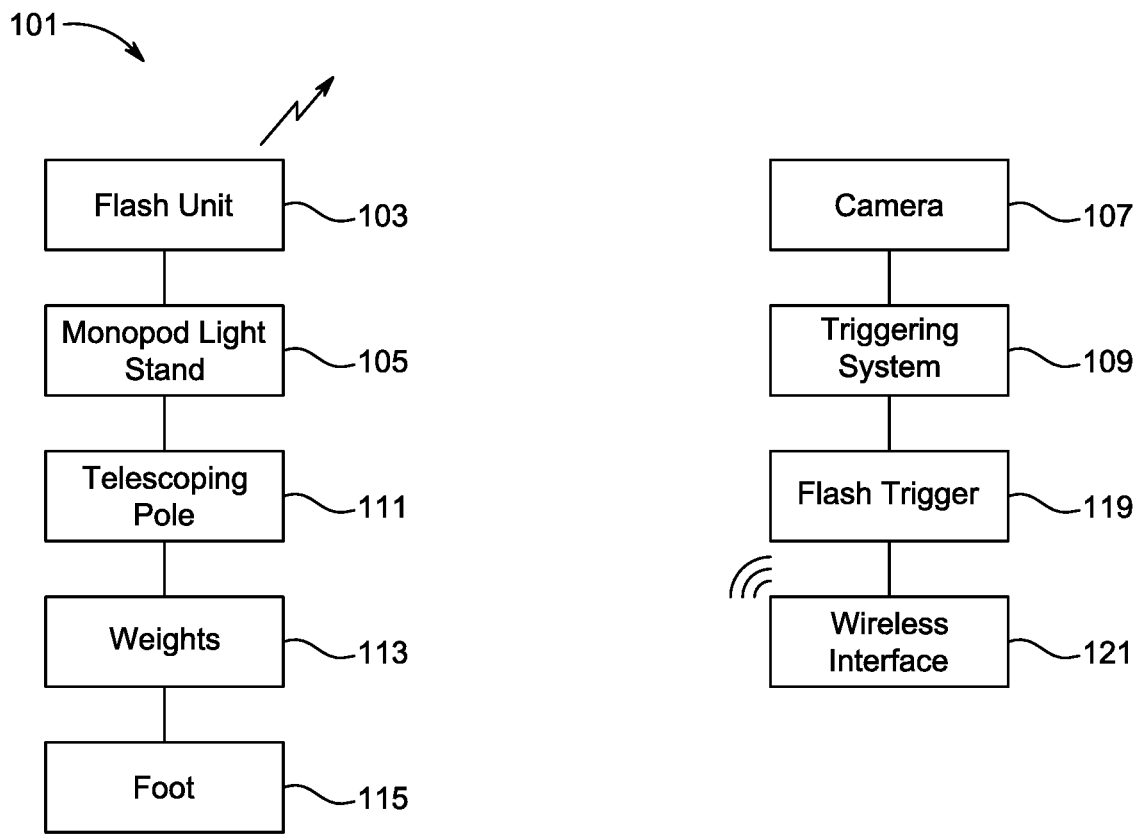
FIG. 1 is a schematic representation of a deployable multiple lighting system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional lighting systems for photography. Specifically, the system of the present invention reduces on-site capture and post-production processing time and resource requirements to deliver desired quality and consistency of photographs. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic representation of a deployable multiple lighting system 101 in accordance with a preferred embodiment of the present application. It will be appreciated that the deployable multiple lighting system 101 overcomes one or more of the above-listed problems commonly associated with conventional lighting systems for photography.

In the contemplated embodiment, the deployable multiple lighting system 101 includes a plurality of flash units 103, a plurality of monopod light stands 105, a camera 107, and a triggering system 109. It should be appreciated that the deployable multiple lighting system 101 can include common-off-the-shelf (COTS) equipment, manufacturer-specific equipment, or a combination thereof.

The plurality of flash units 103 is configured to be in wireless communication with the triggering system 109 via a wireless interface 121. It should be appreciated that the plurality of flash units 103 includes an integral battery. It should also be appreciated that the plurality of flash units 103 is light weight.

The plurality of monopod light stands 105 is configured to receive and secure the plurality of flash units 103 thereto. In addition, the plurality of monopod light stands 105 includes a telescoping pole 111, a plurality of weights 113, and a foot 115. The telescoping pole 111 couples to each foot 115 via the plurality of weights 113. In the preferred embodiment, the telescoping pole 111 can extend up to 10 feet in height. It should be appreciated that the plurality of weights 113 acts as counterweights to improve the stability of their respective monopod light stand 105. It should also be appreciated that the plurality of monopod light stands 105 is light weight.

The triggering system 109 is configured to communicate with the camera 107 and is configured to be in wireless communication with the plurality of flash units 103 via the wireless interface 121. In addition, the triggering system 109 includes a flash trigger 119 configured to transmit a signal to the plurality of flash units 103 via the wireless interface 121 to fire flashes during image capture via the camera 107. It should be appreciated that the plurality of flash units 103 are slaved to the triggering system 109.

It should be appreciated that the deployable multiple lighting system 101 is light weight to enable easy transportation, setup, and breakdown between photography shoots.

It should also be appreciated that one of the unique features believed characteristic of the present application is that it provides for consistent, natural looking diffused lighting within a target space and between various areas and rooms where measurements of light (e.g., intensity (Lux), color (Kelvin), etc.) change dramatically, thereby reducing post-production processing time.

Figure 2:
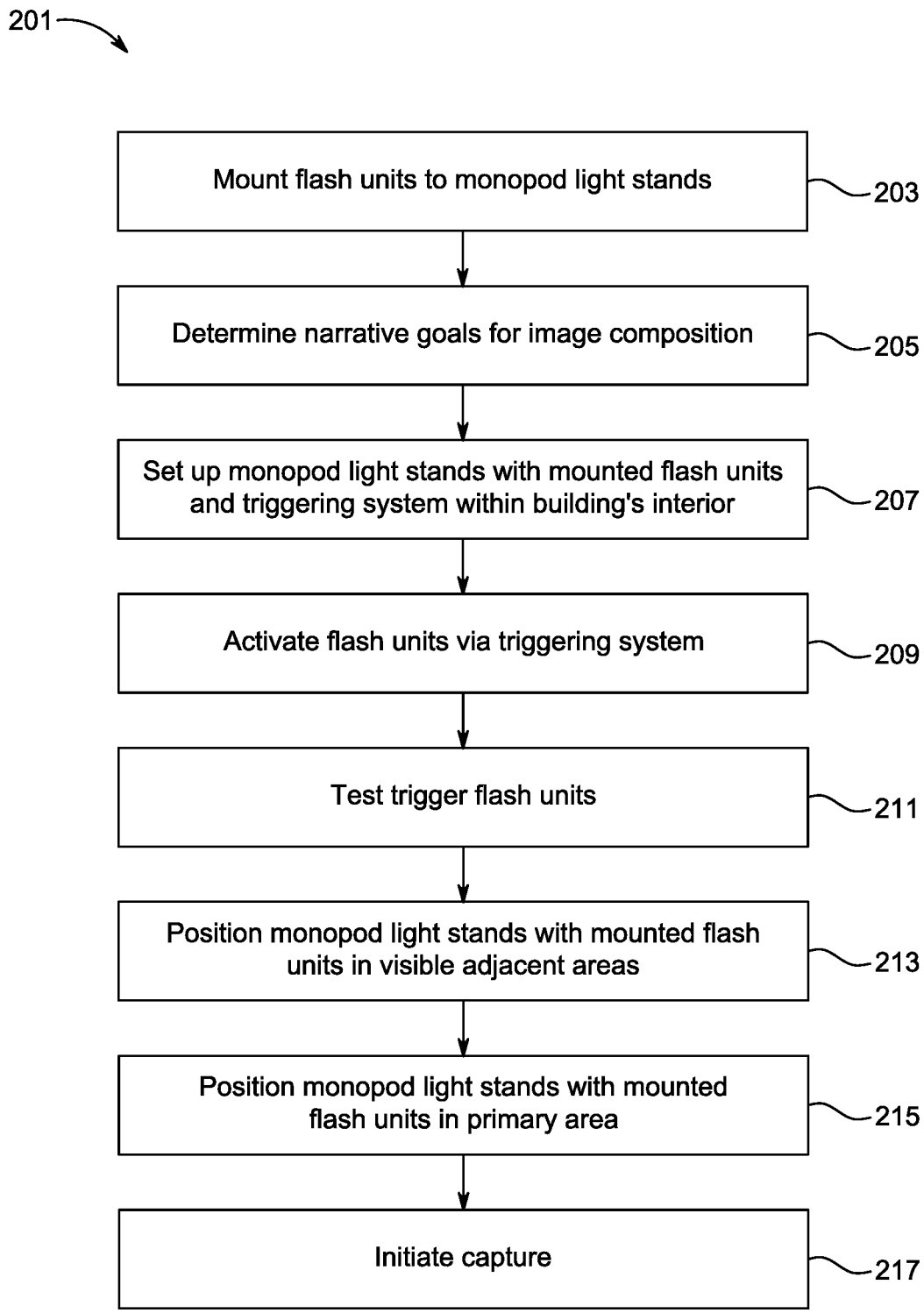
FIG. 2 is a flowchart of a method for capturing a single frame image using the system of FIG. 1.

Referring now to FIG. 2, a flowchart 201 of a method of capturing a single frame image using the deployable multiple lighting system 101 is depicted. First, the flash units are mounted to the monopod light stands, as shown with box 203. Typically, this step is accomplished prior to arriving at a target building's interior. The building's interior can be of a residential interior or a commercial interior. Once the photographer determines narrative goals for the single frame image, the camera, monopod light stands with mounted flash units, and triggering system are set up accordingly, as shown with boxes 205, 207.

Next, the triggering system activates the flash units to fire at the same instance that the camera triggers the triggering system, as shown with box 209. The photographer may then perform a test trigger for the flash units, as shown with box 211. The test trigger is to ensure that the flash units and pool light are not visible within the composition of the target single frame image. In addition, the angle, power and height of the flash units may be adjusted so that the room illumination prevents light pooling and wrong shadows.

Next, the monopod light stands with mounted flash units are positioned in visible adjacent areas, as shown with box 213. This placement is based on the composition of the target single frame image.

Next, the monopod light stands with mounted flash units are positioned in the primary area, as shown with box 215. This placement is based on the composition of the target single frame image.

The photographer may then initiate capture of the target single frame image, as shown with box 217.

Figure 3A:
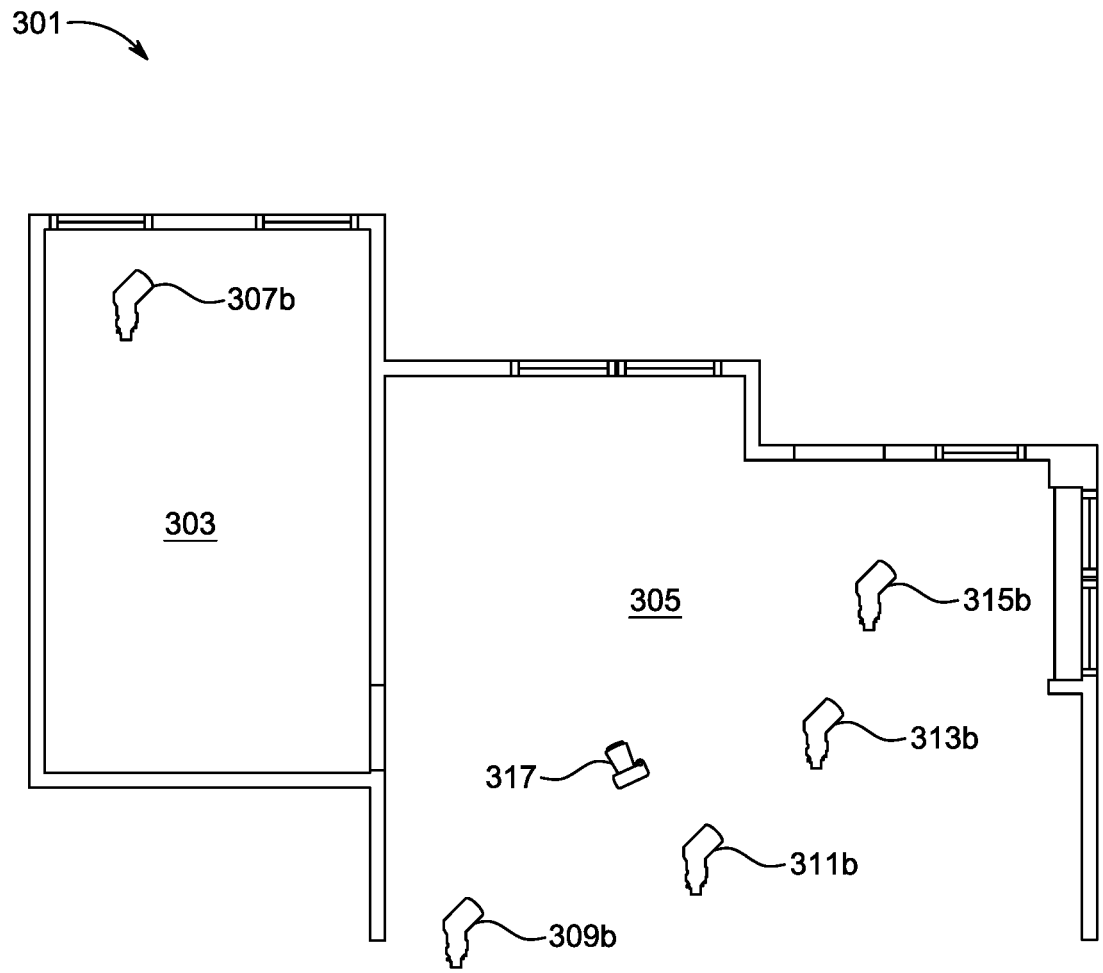
FIG. 3A is a top plan view of an exemplary interior of a building, illustrating the method of FIG. 2 for capturing a single frame image in accordance with the present invention.
Figure 3B:
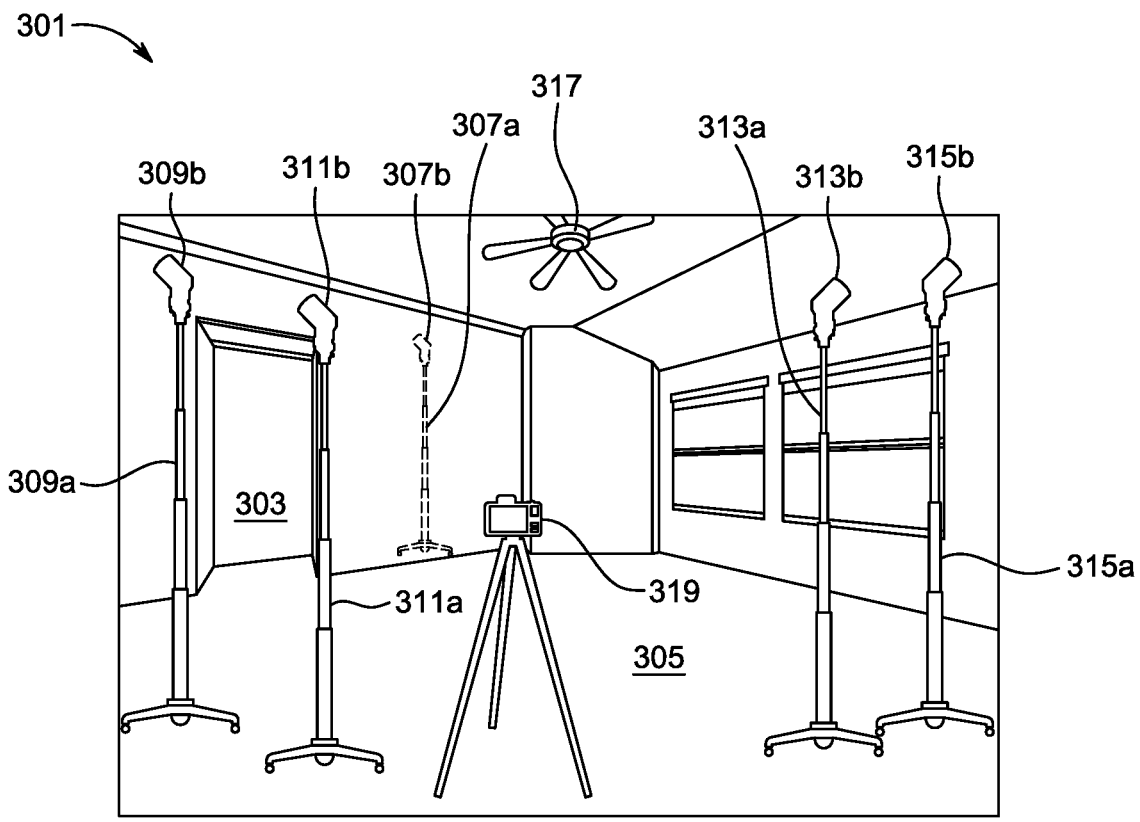
FIG. 3B is an interior elevation view of the exemplary interior of a building of FIG. 3A, illustrating the method of FIG. 2 for capturing a single frame image in accordance with the present invention.

FIGS. 3A and 3B are various views of an exemplary interior of a building 301 utilized in the method of FIG. 2. As shown, the interior 301 includes an adjacent room 303 and a primary room 305. In the adjacent room 303, a first monopod light stand 307a with a first flash unit 307b mounted thereto is positioned such that the height of the first flash unit 307b is close to the ceiling of the adjacent room 303 and, if present, near a ceiling mounted light fixture. This enables the light to reflect and fill the adjacent room 303 with natural fallout lighting that better depicts a natural state of the adjacent room 303.

In the primary room 305, a second, third, fourth, and fifth monopod light stands 309a, 311a, 313a, 315a with a second, third, fourth, and fifth flash units 309b, 311b, 313b, 315b mounted thereto, respectively, are positioned such that the heights of the flash units 309b, 311b, 313b, 315b are close to the ceiling of the primary room and, if present, near a ceiling mounted light fixture (e.g., a ceiling fan) 317. These placements enable the light to reflect and fill the primary room 305 with natural fallout lighting that better depicts a natural state of the primary room 305. In addition, a camera 319 is positioned in the primary room 305 according to the target single frame image.

Figure 4:
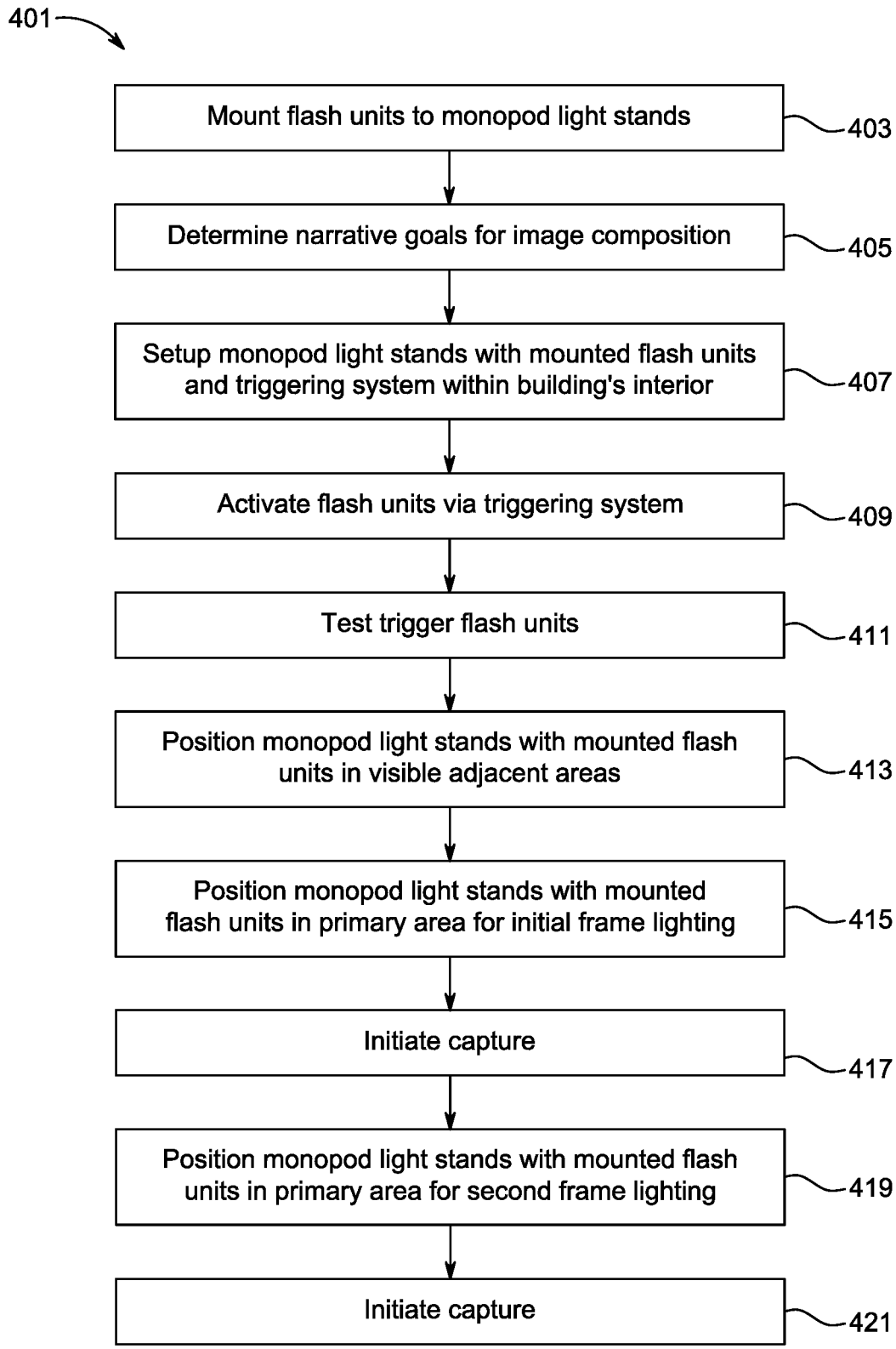
FIG. 4 is a flowchart of a method for capturing a two-frame image using the system of FIG. 1.

Referring now to FIG. 4, a flowchart 401 of a method of capturing a two-frame image using the deployable multiple lighting system 101 is depicted. A two-frame image is created by use of multiple flash placements within a camera's view. The initial frame is captured with the flashes positioned to illuminate a portion of an area of a room, and the second frame is captured with the flashes positioned to illuminate the opposite area of the room.

First, the flash units are mounted to the monopod light stands, as shown with box 403. Typically, this step is accomplished prior to arriving at a target building's interior. The building's interior can be of a residential interior or a commercial interior. Once the photographer determines narrative goals for the two-frame image, the camera, monopod light stands with mounted flash units, and triggering system are set up accordingly, as shown with boxes 405, 407.

Next, the triggering system activates the flash units to fire at the same instance that the camera triggers the triggering system, as shown with box 409. The photographer may then perform a test trigger for the flash units, as shown with box 411. The test trigger is to ensure that the flash units are not visible within the composition of the target two-frame image. In addition, the angle, power and height of the flash units may be adjusted so that the room illumination prevents light pooling and wrong shadows.

Next, the monopod light stands with mounted flash units are positioned in visible adjacent areas, as shown with box 413. This placement is based on the composition of the target two-frame image.

Next, the monopod light stands with mounted flash units are positioned in the primary area for the initial frame lighting, as shown with box 415. This placement is based on the composition of the target two-frame image. The photographer may then initiate capture for the initial frame of the two-frame image, as shown with box 417.

Next, the monopod light stands with mounted flash units are positioned in the primary area for the second frame lighting, as shown with box 419.

The photographer may then initiate capture for the second frame of the two-frame image, as shown with box 421. The initial frame and the second frame can be layered and composited into a two-frame image using various software commercially available as well as rudimentary techniques. The two-frame image can also be processed to remove visible flashes, unwanted light, etc., through the aforementioned techniques.

Figure 5A:
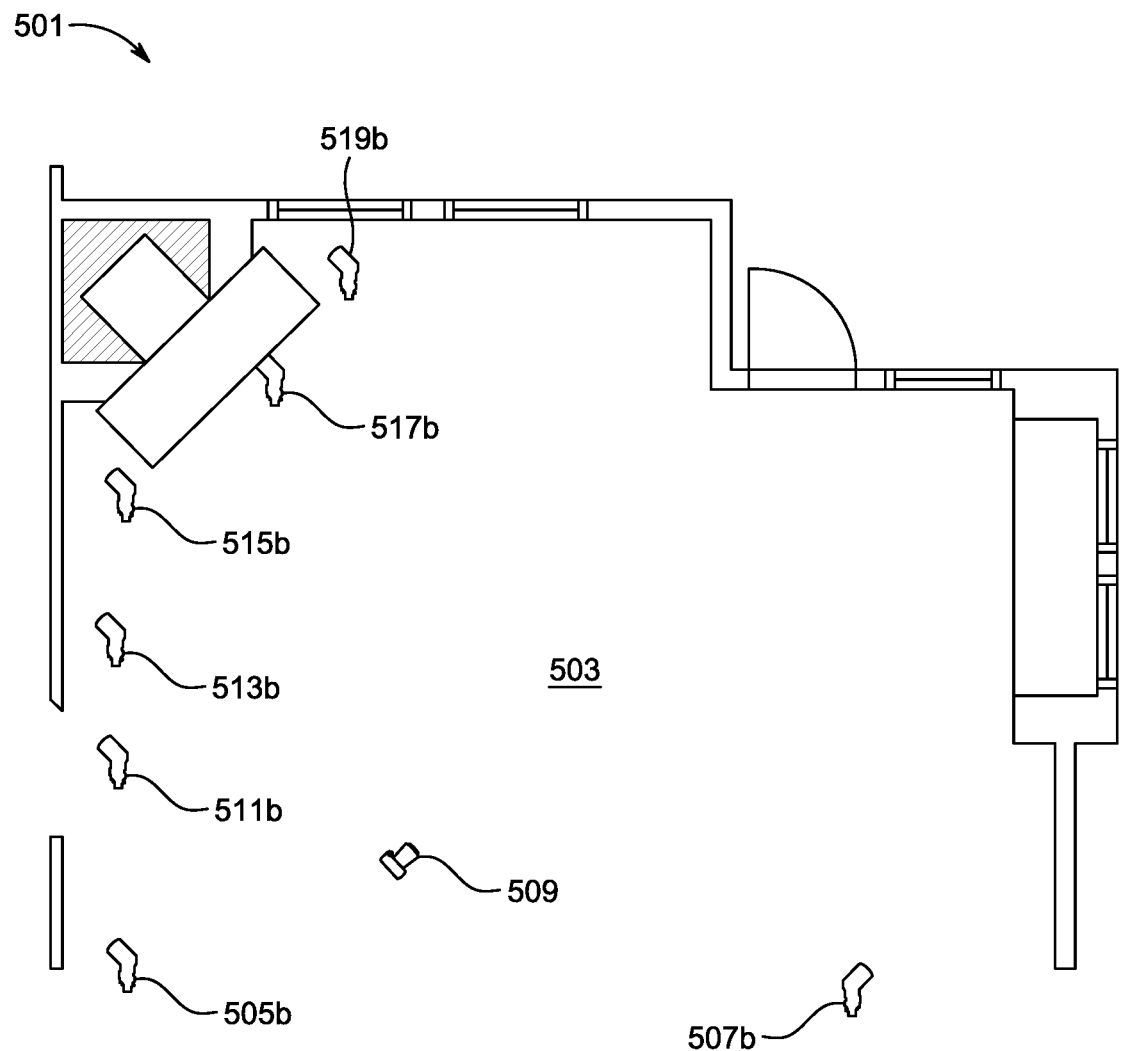
FIG. 5A is a top plan view of an exemplary interior of a building, illustrating the method of FIG. 4 for capturing an initial frame of a two-frame image in accordance with the present invention.
Figure 5B:
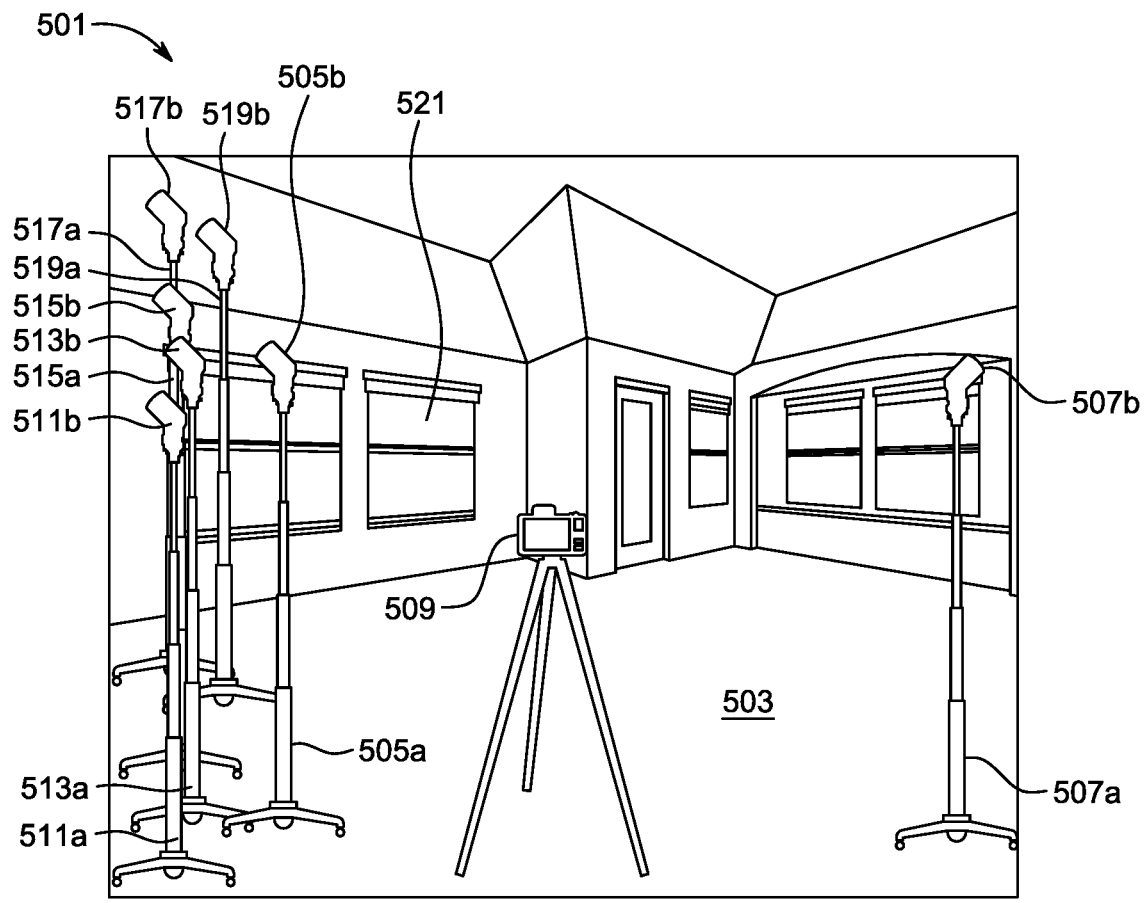
FIG. 5B is an interior elevation view of the exemplary interior of a building of FIG. 5A, illustrating the method of FIG. 4 for capturing an initial frame of a two-frame image in accordance with the present invention.

FIGS. 5A and 5B are various views of an exemplary interior of a building 501 utilized in the method of FIG. 4 for capturing an initial frame of a two-frame image. As shown, the interior 501 includes a primary room 503 having a first monopod light stand 505a having a first flash unit 505b mounted thereto, and a second monopod light stand 507a having a second flash unit 507b mounted thereto. The monopod light stands 505a, 507a are positioned such that the flash units 505b, 507b are close to the ceiling of the primary room 503 and, if present, near a ceiling mounted light fixture. This enables the light to reflect and fill the primary room 503 with natural fallout lighting that better depicts a natural state of the primary room 503. In addition, a camera 509 is positioned in the primary room 503 according to the target two-frame image.

The primary room 503 also includes a monopod light stands 511a, 513a, 515a, 517a, 519a with corresponding flash units 511b, 513b, 515b, 517b, 519b mounted thereto, respectively, are positioned such that the heights of the 511b, 513b, 515b, 517b, 519b are above windows 521. This is to prevent unwanted reflections and glare.

It should be appreciated that the flash units 511b, 513b, 515b, 517b, 519b are placed within the visible area of the composition on the left side of the room, illuminating the right side of the room. The flash units 511b, 513b, 515b, 517b, 519b are spaced as such to reflect light that bounces off the ceiling into the right side of the room.

Figure 5C:
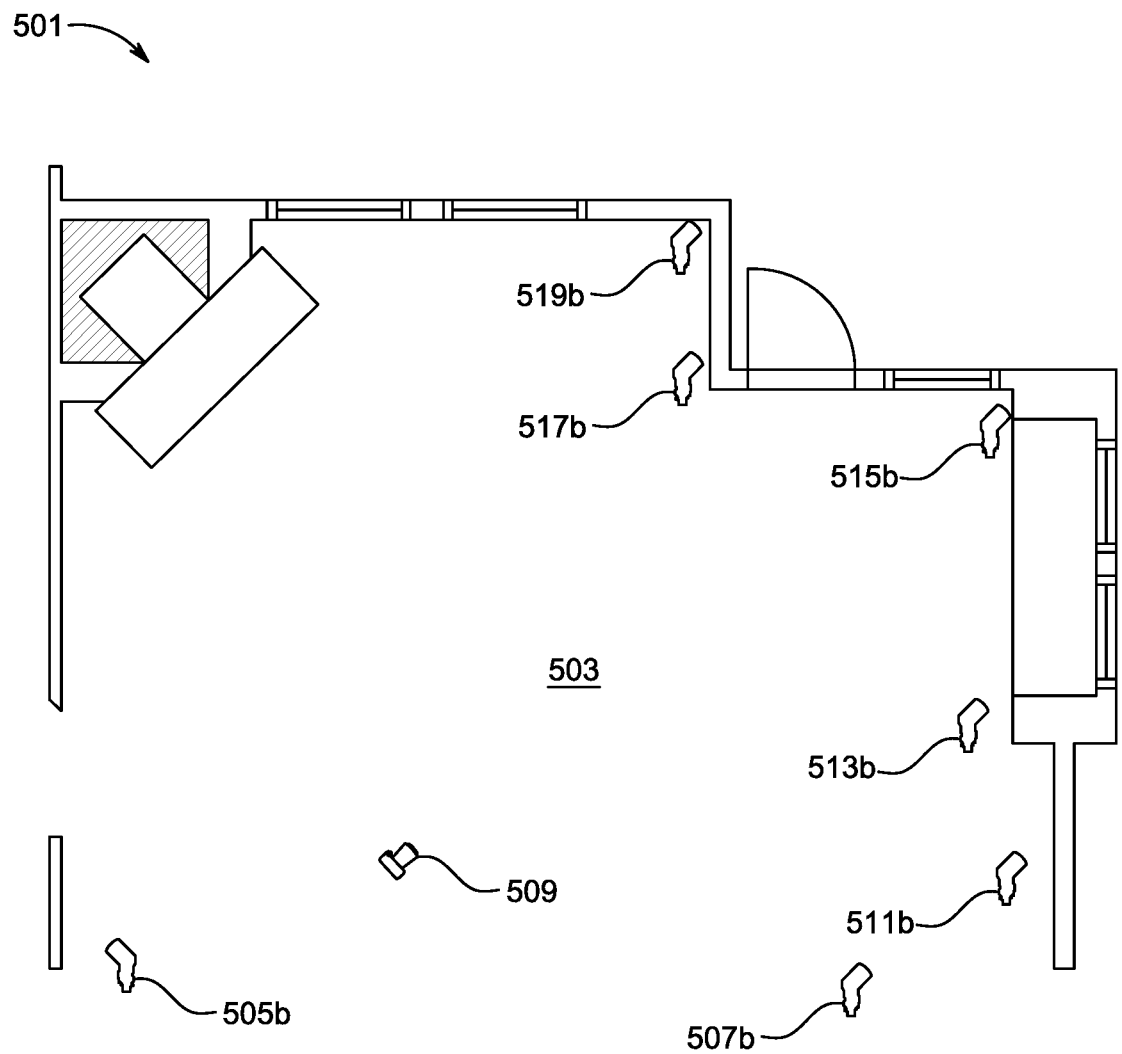
FIG. 5C is a top plan view of the exemplary interior of a building of FIG. 5A, illustrating the method of FIG. 4 for capturing a second frame of the two-frame image in accordance with the present invention.
Figure 5D:
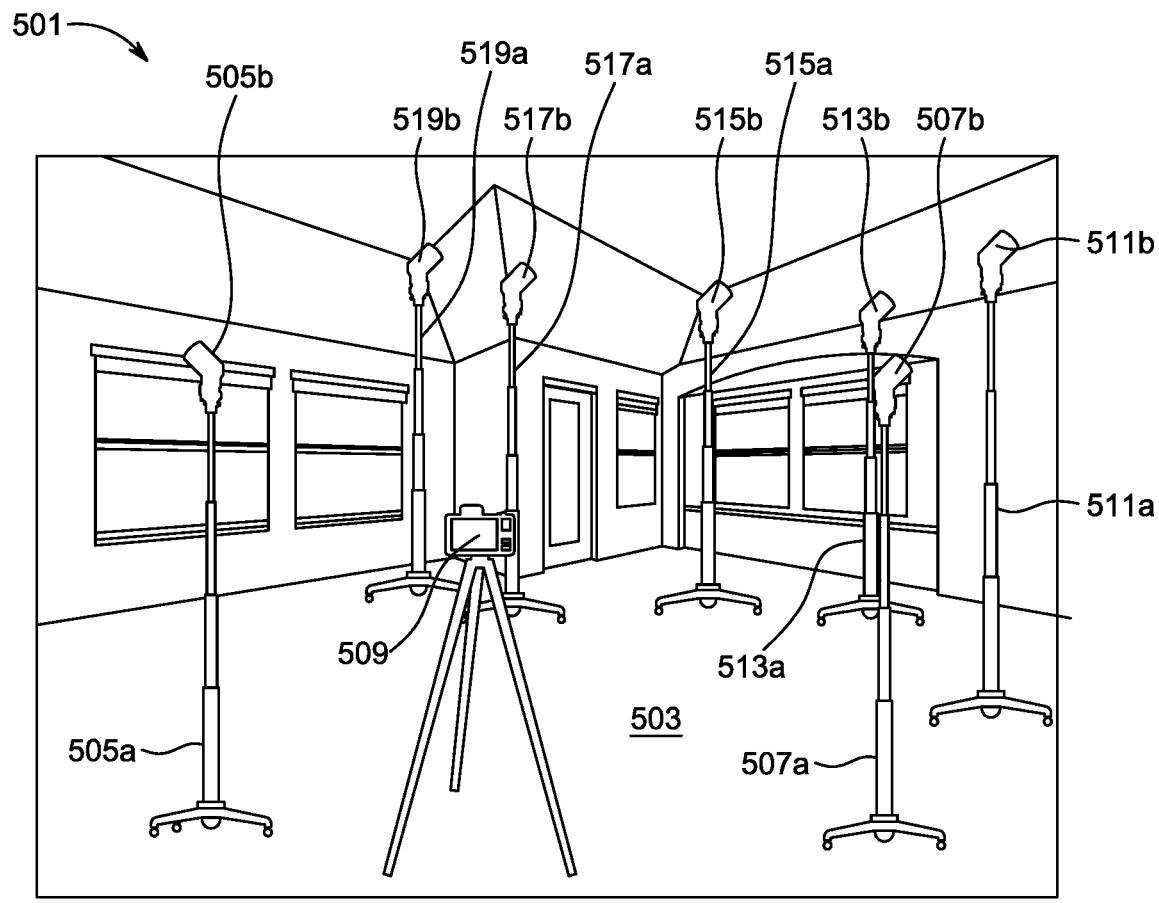
FIG. 5D is an interior elevation view of the exemplary interior of a building of FIG. 5A, illustrating the method of FIG. 4 for capturing a second frame of the two-frame image in accordance with the present invention.

FIGS. 5C and 5D are various views of the exemplary interior 501 utilized in the method of FIG. 4 for capturing the second frame of the two-frame image. As shown, the monopod light stands 511a, 513a, 515a, 517a and their respective flash units 511b, 513b, 515b, 517b are placed within the visible area of the composition on the right side of the room, illuminating the left side of the room. The flash units 511b, 513b, 515b, 517b, 519b are spaced as such to reflect light that bounces off the ceiling into the left side of the room.

It should be appreciated that the monopod light stands 505a, 505b, their respective flash units 505b, 507b, and the camera 509 remain in place for both the initial frame capture and the second frame image capture to prevent misalignment between the two images.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for capturing a two-frame image of an interior of a building, including residential and commercial interiors, the method comprising:

providing a deployable multiple lighting system, the deployable multiple lighting system having:
  a camera;
  a triggering system in communication with the camera, the trigger system having:
    a flash trigger;
  a plurality of flash units configured to be in wireless communication with the triggering system, the plurality of flash units having an integral battery; and
  a plurality of monopod light stands configured to receive and secure the plurality of flash units thereto, the plurality of monopod light stands having:
    a telescoping pole; and
    a foot;
    wherein the foot is supported with a plurality of weights;
wherein the triggering system is configured to be in communication with the camera and configured to be in wireless communication with the plurality of flash unit; and
wherein the flash trigger is configured to send a signal to the plurality of flash units to fire flashes during image capture via the camera;
mounting the plurality of flash units to the plurality of monopod light stands;
determining one or more narrative goals for the two-frame image, the narrative goals is determined by a required lighting within an interior of a room;
setting up the camera, the plurality of monopod light stands with mounted flash units, and the triggering system;
performing a test trigger for the plurality of flash units, the test trigger remotely activates the mounted flash unit simultaneously, the test trigger is used to determine one or more of the plurality of flash units are visible within a composition of the two-frame image and to determine if a light pooling and a shadow is present;
positioning the plurality of monopod light stands with mounted flash units in an adjacent area within view, at least in part, of the target two-frame image;
positioning the plurality of monopod light stands with mounted flash units in a primary area for an initial frame of the two-frame image;
initiating capture of the initial frame of the two-frame image;
positioning the plurality of monopod light stands with mounted flash units in a primary area for a second frame of the two-frame image; and
initiating capture of the second frame of the two-frame image with the camera.

* * * * *